United States Patent
Itoh

(10) Patent No.: US 6,538,993 B1
(45) Date of Patent: Mar. 25, 2003

(54) ATM SWITCH AND QUALITY CONTROL METHOD FOR AN ATM CONNECTION

(75) Inventor: Jun Itoh, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/271,651

(22) Filed: Mar. 18, 1999

(30) Foreign Application Priority Data

Jul. 28, 1998 (JP) .......................................... 10-212239

(51) Int. Cl.$^7$ .............................................. H04L 12/56
(52) U.S. Cl. .................................. 370/230; 370/395.2
(58) Field of Search .............................. 370/229, 230, 370/231, 232, 233, 253, 236.2, 241.1, 298, 299, 395.2, 395.21, 395.3, 395.43

(56) References Cited

U.S. PATENT DOCUMENTS

| | | | | |
|---|---|---|---|---|
| 5,070,498 A | * | 12/1991 | Kakuma et al. | 370/60 |
| 5,583,857 A | * | 12/1996 | Soumiya et al. | 370/233 |
| 5,774,454 A | * | 6/1998 | Kim et al. | 370/232 |
| 5,818,818 A | * | 10/1998 | Soumiya et al. | 370/252 |
| 5,933,425 A | * | 8/1999 | Iwata | 370/351 |
| 5,959,991 A | * | 9/1999 | Hatono et al. | 370/395 |
| 6,014,384 A | * | 1/2000 | Weberhofer | 370/455 |
| 6,185,186 B1 | * | 2/2001 | Watanabe | 370/232 |
| 6,212,163 B1 | * | 4/2001 | Aida | 370/230 |
| 6,240,066 B1 | * | 5/2001 | Nagarajan et al. | 370/230 |
| 6,330,222 B1 | * | 12/2001 | Ebisawa | 370/230 |

FOREIGN PATENT DOCUMENTS

| | | |
|---|---|---|
| JP | 4-109730 | 4/1992 |
| JP | 5-37543 | 2/1993 |
| JP | 5-122242 | 5/1993 |

* cited by examiner

Primary Examiner—Hassan Kizou
Assistant Examiner—Anh-Vu Ly
(74) Attorney, Agent, or Firm—Katten Muchin Zavis Rosenman

(57) ABSTRACT

An ATM switch including a switch unit routing an ATM through an ATM connection; a controller controlling the quality of the ATM connection; and a memory for storing a quality control identifier for linking declared information concerning ATM connection quality, which is included in a call signal requesting the setup of the ATM connection, with a capability identifier for identifying the capability of the controller. The controller controls the ATM connection quality based on the capability corresponding to the capability identifier designated based on the quality control identifier obtained from the declared information. If the quality requested in the declared information is changed due to a change in an advisory promulgated by an advisory organization, a different capability identifier can be assigned by changing or adding to the setup of the quality control identifier in accordance with the updated quality.

20 Claims, 16 Drawing Sheets

FIG. 5

| ASC (a) | BC (b) | ATC (c) | BEI (d) | Equivalent UNI 3.0/3.1 Octet 5a Definitions | Comment |
|---|---|---|---|---|---|
| CBR | A | abs | | absent | |
| | | 7 | no | CBR traffic type, reserved timing requirement | new in UNI 4.0, invalid UNI 3.1 BBC octet 5a coding |
| | X | 4 | | CBR traffic type, timing not indicated | |
| | | 5 | | CBR traffic type, end-to-end timing required | |
| | | 6 | no | CBR traffic type, end-to-end timing not required | |
| | | 7 | | CBR traffic type, reserved timing requirement | new in UNI 4.0, invalid UNI 3.1 BBC octet 5a coding |
| | VP | 5 | | CBR traffic type, end-to-end timing required | new in UNI 4.0 |
| | | 7 | no | CBR traffic type, reserved timing requirement | new in UNI 4.0, invalid UNI 3.1 BBC octet 5a coding |
| rt-VBR | C | 9 | | VBR traffic type, end-to-end timing required | |
| | | 19 | no | undefined traffic type, reserved timing requirement | new in UNI 4.0, invalid UNI 3.1 BBC octet 5a coding |
| | X | 1 | | traffic type not indicated, end-to-end timing required | |
| | | 9 | no | VBR traffic type, end-to-end timing required | |
| | | 19 | | undefined traffic type, reserved timing requirement | new in UNI 4.0, invalid UNI 3.1 BBC octet 5a coding |
| | VP | 9 | | VBR traffic type, end-to-end timing required | new in UNI 4.0 |
| | | 19 | no | undefined traffic type, reserved | new in UNI 4.0, invalid UNI |

FIG. 6

| QOS CLASS | ASC | | | | |
|---|---|---|---|---|---|
| | CBR | rt-VBR | nrt-VBR | ABR | UBR |
| 0 | QSC8/9 | QSC8/9 | QSC8/9 | QSC7 | QSC8/9 |
| 1 | QSC4 | QSC5 | NA | NA | NA |
| 2 | QSC4 | QSC5 | NA | NA | NA |
| 3 | NA | NA | QSC6 | NA | NA |
| 4 | NA | NA | QSC6 | NA | NA |

NA: Not Available

FIG. 7

QSC vs QCP table

| QSC | → | Common device | Individual device |
|---|---|---|---|
| 0 | | QCP0 | — |
| 1 | | QCP11 | — |
| 2 | | QCP2 | QCP0 |
| 3 | | — | — |
| 4 | | QCP1 | QCP0 |
| 5 | | QCP1 | QCP0 |
| 6 | | QCP4 | QCP2 |
| 7 | | QCP4 | QCP2 |
| 8 | | QCP5 | QCP3 |
| 9 | | QCP6 | QCP4 |
| 10 | | QCP10 | QCP7 |

FIG. 8

| QOS CLASS | ASC | | | | |
|---|---|---|---|---|---|
| | CBR | rt-VBR | nrt-VBR | ABR | UBR |
| * | QSC4 | QSC5 | QSC6 | NA | NA |

*: Any number in 0~4

FIG. 9

| QOS CLASS | ASC | | | | |
|---|---|---|---|---|---|
| | CBR | rt-VBR | nrt-VBR | ABR | UBR |
| 0 | QSC9 | QSC9 | QSC9 | QSC7 | QSC9 |
| 1 | QSC9 | QSC9 | NA | NA | NA |
| 2 | QSC9 | QSC9 | NA | NA | NA |
| 3 | NA | NA | QSC9 | NA | NA |
| 4 | NA | NA | QSC9 | NA | NA |

FIG. 10

| QSC | New advisory | | Old advisory | |
|---|---|---|---|---|
| | Common device | Individual device | Common device | Individual device |
| 0 | QCP0 | - | QCP2 | - |
| 1 | QCP11 | - | - | - |
| 2 | QCP2 | QCP0 | QCP0/1 | QCP0 |
| 3 | - | - | - | - |
| 4 | QCP1 | QCP0 | QCP0 | QCP0 |
| 5 | QCP1 | QCP0 | QCP0 | QCP0 |
| 6 | QCP4 | QCP2 | QCP1 | QCP0 |
| 7 | QCP4 | QCP2 | QCP1 | QCP0 |
| 8 | QCP5 | QCP3 | - | QCP1 |
| 9 | QCP6 | QCP4 | QCP2 | QCP2 |
| 10 | QCP10 | QCP7 | QCP3 | QCP3 |

| Declared CLR | CBR | rt-VBR | nrt-VBR | ABR | UBR |
|---|---|---|---|---|---|
| $10^{-11} \sim 10^{-15}$ | reject | reject | reject | reject | reject |
| $10^{-10}$ | QSC4 | QSC5 | QSC5 | reject | reject |
| $10^{-9}$ | QSC4 | QSC5 | QSC5 | reject | reject |
| $10^{-8}$ | QSC4 | QSC5 | QSC5 | reject | reject |
| $10^{-7}$ | QSC4 | QSC5 | QSC6 | reject | reject |
| $10^{-1} \sim 10^{-6}$ | QSC4 | QSC5 | QSC6 | reject | reject |

ASC

FIG. 15

| Traffic pattern ASC | PCR | | SCR,MBS | SCR,MBS |
|---|---|---|---|---|
| | CLP=0 | CLP=0+1 | CLP=0 | CLP=0+1 |
| CBR | - | ○ | - | - |
| | ○ | ○ | - | - |
| rt-VBR | - | ○ | ○ | - |
| | - | ○ | - | ○ |
| nrt-VBR | - | ○ | ○ | - |
| | - | ○ | - | ○ |

FIG. 17

QSC vs QCP table

|  | Common device | |
|---|---|---|
| QSC → | Normal | Corrected |
| 0 | QCP0 | QCP0 |
| 1 | QCP11 | QCP11 |
| 2 | QCP2 | QCP2 |
| 3 | — | — |
| 4 | QCP1 | QCP1 |
| 5 | QCP1 | QCP1 |
| 6 | QCP4 | QCP1 |
| 7 | QCP4 | QCP5 |
| 8 | QCP5 | QCP5 |
| 9 | QCP6 | QCP6 |
| 10 | QCP10 | QCP10 |

Corrected part: rows 6 and 7

PRIOR ART

ATM SWITCH AND QUALITY CONTROL METHOD FOR AN ATM CONNECTION

BACKGROUND OF THE INVENTION

1. Field of the Invention

The present invention relates to a quality control method for transmitting information which have various traffic conditions, such as voice, moving pictures and data by an ATM (Asynchronous Transfer Mode) switching.

2. Related Arts

The broadband ISDN (Integrated Services Digital Network) has been studied and developed as a next-generation communication network by which to provide standardized communication services for various types of information, such as voice, moving pictures and data.

The ATM (Asynchronous Transfer Mode) technique is a technique whereby, regardless of the communication speeds required for information, such as voice, moving pictures and data, all of which have a different traffic condition requirements, all the information is converted into a packet, called a cell, having a fixed length, and the cell is transmitted at high speed.

According to the ATM switching, the quality of the communication service must be adjusted in accordance with the traffic condition requirements for the information to be transferred.

Recently, advisory organizations, such as the ITU-T (International Telecommunication Union, Telecommunication Standardization Sector) and the ATM Forum, have formulated declaration procedures which enable an ATM network user to select one of various quality control types to declare in consonance with the operating condition or the use for which the network is applied.

To provide quality control for ATM switching, the above advisory organizations have defined the following five basic functions and their relevant control principles.

(1) Call Admission Control (CAC)

This control function is used to ascertain whether a setup connection can be used for a communication having a predetermined quality which was previously declared by a call signal.

(2) Usage Parameter Control (UPC)

This control function is used for monitoring the number of cells (the traffic) transmitted to an ATM switch, in accordance with the transfer capacity which was originally declared using a call signal.

(3) Shaping Control

This control function is used for the storing cells in a buffer memory when the traffic exceeds the maximum transfer capacity, and for restricting and averaging the transfer capacity.

(4) Priority Control

This control function is used for determining whether or not ATM cells are classified as priority cells, and for abandoning ATM cells that are not classified as priority cells at first.

(5) Congestion Control

This control function is used to reduce traffic congestion. Specifically, the acceptance of a call is halted, or an ATM cell is transmitted by being rerouted around a connection at which a congested condition exists.

In the ATM switch, the degree to which the functions are implemented and the capabilities (accuracy) of the functions greatly depend on the performance of a controller, which is hardware which is employed to achieve the above functions. Basic control of these functions is provided by software.

FIG. 18 is a flowchart showing the conventional quality control provided for an ATM switch. When a call signal requesting that a connection be set up is transmitted by a subscriber's terminal to the ATM switch, the ATM switch analyzes accompanying declared information, which is included in the call signal, concerning quality control provisions (step S1). Then, the ATM switch selects a capability identifier QCP, which corresponds to a specific quality control factor requested in the declared information, for the controller which provides the quality control function for a connection in the ATM switch (step S2). The QCP is a capability identifier for identifying the quality control capability of the controller, and, as an example, has twelve levels (QCP 1 to QCP 12). When, at step S3, it is determined that consistency that quality control according to the capability identifier QCP can be provided or not, the controller (hardware) provides the quality control for a connection in accordance with the determined capability identifier QCP (step S4). As is described above, conventionally, a one-to-one correspondence is employed when setting the capability identifier QCP for a requested quality.

Assumed is a case wherein in this situation the contents of an advisory from one of the above advisory organizations, or the contents of an operation initiated by a user are changed, and a communication service which ensures a higher quality is requested, or a case wherein a future communication service that ensures better quality control may become available as a result of an improvement in the performance of the hardware. In such a case, since, as described above, for conventional software control a one-to-one correspondence is employed when setting the capability identifier QCP for the requested quality, a new ATM switch must be introduced, or an ATM network configuration must be rearranged (e.g., a countermeasure is employed whereby an ATM switch which can provide a high level of quality control is installed at the entrance of a conventional network) in order to achieve a higher quality communication service.

However, the introduction of an new ATM switch or the rearrangement of a network increases the cost of the ATM switch or the running costs for the network, so that a great load will be imposed on the operator of an ATM network and the expansion property of the ATM network will be deteriorated, and accordingly, the services provided to network users may be degraded. Therefore, for ATM switching the quality control for a conventional ATM switch has a poor expansion property.

SUMMARY OF THE INVENTION

It is, therefore, one objective of the present invention to provide an ATM switch having an expansion property which can cope with a conventional high quality control operation, and a quality control method for an ATM connection.

To achieve the above objective, according to one aspect of the present invention, it is provided an ATM switch comprising:

a switch unit for routing an ATM cell input from an ATM connection at an input site to the ATM connection at an output site;

a controller for controlling the quality of the ATM connection; and a memory for storing a quality control identifier for linking declared information concerning the quality of the ATM connection, which is included in a call signal requesting the setup of the ATM connection, with a capability identifier for identifying the capability of the controller, wherein the controller controls the quality of the ATM connection based on the capability corresponding to the capability identifier designated based on the quality control identifier obtained from the declared information.

With this arrangement, the quality control identifier for linking the declared information, which is included in a call signal, with the capability identifier, which identifies the capability of the controller for controlling the quality of an ATM connection, is introduced. If the quality requested in the declared information is changed due to a change in an advisory promulgated by an advisory organization, a different capability identifier can be assigned by changing or adding to the setup of the quality control identifier in accordance with the updated quality. Therefore, the quality control provided for the declared information can be easily changed to another type of quality control, and the expansion property of the ATM switch can be enhanced.

Furthermore, to achieve the above objective, according to another aspect of the present invention, it is provided a quality control method for controlling quality of an ATM connection comprising the steps of:

obtaining a quality control identifier from a declared information which is concerning the quality of the ATM connection and included in a call signal requesting the setup of the ATM connection and, the quality control identifier is for linking the declared information with a capability identifier for identifying the capability of a controller which controls the quality of the ATM connection;

designating the capability identifier based on obtained quality control identifier; and controlling the quality of the ATM connection based on a capability corresponding to the designated capability identifier.

Other features and advantages of the present invention will become readily apparent from the following description when taken in conjunction with the accompanying drawings.

BRIEF DESCRIPTION OF THE DRAWINGS

FIG. 5 is a diagram showing a table for describing the relationship between declared information and corresponding ATM service category ASC;

FIG. 6 is a diagram showing an example QSC determination table for ATM service category ASC and quality control information QOS;

FIG. 7 is a diagram showing a table for quality control identifiers QSC and corresponding capability identifiers QCP;

FIG. 8 is a diagram showing a table wherein the same quality control identifier QSC is entered for the quality control information QOS and the ATM service category ASC;

FIG. 9 is a diagram showing a table for the ATM service category ASC and the corresponding quality control identifier QSC;

FIG. 10 is a diagram showing an example table wherein a plurality of capability identifiers QCP are set for each quality control identifier QSC;

FIG. 15 is a diagram showing the relationship between the ASC and the traffic control information;

FIG. 17 is a diagram showing a table showing the relationship between the QSC and a corresponding corrected QCP which is corrected in accordance with the frequency of the employment of a buffer area.

DETAILED DESCRIPTION OF THE PREFERRED EMBODIMENTS

The preferred embodiments of the present invention will now be described while referring to the accompanying drawings. It should be noted, however, that the technical scope of the present invention is not limited to these embodiments.

Figure 1:
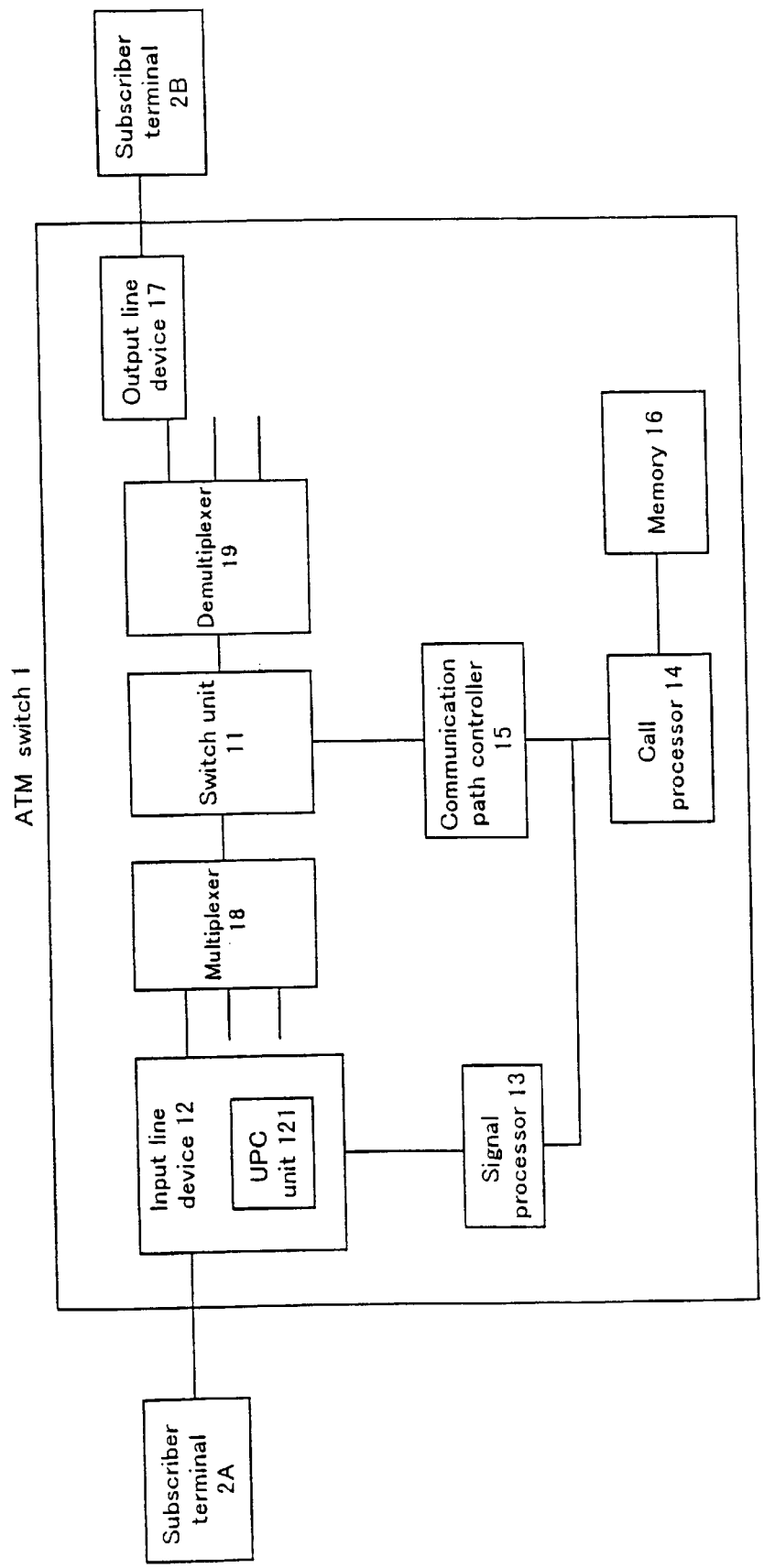
FIG. 1 is a diagram illustrating the general arrangement of an ATM switch according to the present invention.

FIG. 1 is a diagram illustrating the general arrangement of an ATM switch according to the present invention. An explanation will be given for the transmission of data by a subscriber terminal 2A to a subscriber terminal 2B in FIG. 1. Using hardware switching, an ATM switch 11 performs the routing for a data cell which is transmitted by the subscriber terminal 2A to the subscriber terminal 2B.

An input line device 12 and an output line device 17 are devices for terminating transmission paths connected thereto. Therefore, one of these devices 12 and 17 is provided for each transmission path connected to the ATM switch 1. An ATM connection which is identified by a virtual path identifier (VPI) and a virtual channel identifier (VCI) is set for each transmission path. The ATM connection between the subscriber terminal 2A and the input line device 12 is called an input site ATM connection, while the ATM connection between the subscriber terminal 2B and the output line device 17 is called an output site ATM connection.

An input line device 12 which has received a data cell from a subscriber terminal 2A via an input site ATM connection adds a tag to the data cell and transmits that data cell to the ATM switch 11. The ATM switch 11 performs the routing for the received data cell, and transmits the data cell to the output line device 17. Upon receiving the data cell, the output line device 17 removes the tag from the data cell and transmits the data cell to the subscriber terminal 2B via the output side ATM connection.

The input line device 12 includes a UPC (Usage Parameter Control) unit 121 for monitoring the flow rate of ATM cells which are input. The UPC unit 121 has a buffer memory in which received ATM cells are temporarily stored and are read at a declared bit rate. When the rate at which ATM cells flow into the buffer memory is greater than the bit rate, the ATM cells are abandoned according to a previously declared cell loss ratio. The UPC unit 121 is one of the hardware control units used for performing quality control which were described for the prior art.

A multiplexer 18, which multiplexes ATM cells which are output by a plurality of input line devices 12, is provided between the input line device 12 and the ATM switch 11 and transmits the resultant ATM cells to the ATM switch 11. A demultiplexer 19, which demultiplexes the multiplexed ATM cells which are received from the ATM switch 11, is provided between the output line device 17 and the ATM switch 11. The multiplexer 18 and the demultiplexer 19 are supplied with buffer memories, and control the flow rate of the ATM cells which pass through these devices. Therefore, the multiplexer 18 and the demultiplexer 19 are also hardware control units.

A signal processor 13 analyzes control signals, such as call signals for setting ATM connections.

A call processor 14 exercises call admission control (CAC) based on a call signal, or call release control based on a call release signal. When a specific line is congested, the call processor 14 halts the admission of calls for that line. That is, when the line is in an overloaded traffic state, at a bit rate obtained from traffic information and bearer information, which constitute the declared information included in a call signal concerning quality, the call processor 14 rejects the setting up of an ATM connection for the call. The call processor 14 is connected to a memory 16 in which various types of data, such as call process data and subscriber data, are stored. As was described in the prior art, the call processor 14 is one of the hardware control units used for quality control.

A communication path controller 15 is a device for setting up or releasing a connection based on the call admission control or the call release control performed by the call processor 14.

Figure 2:
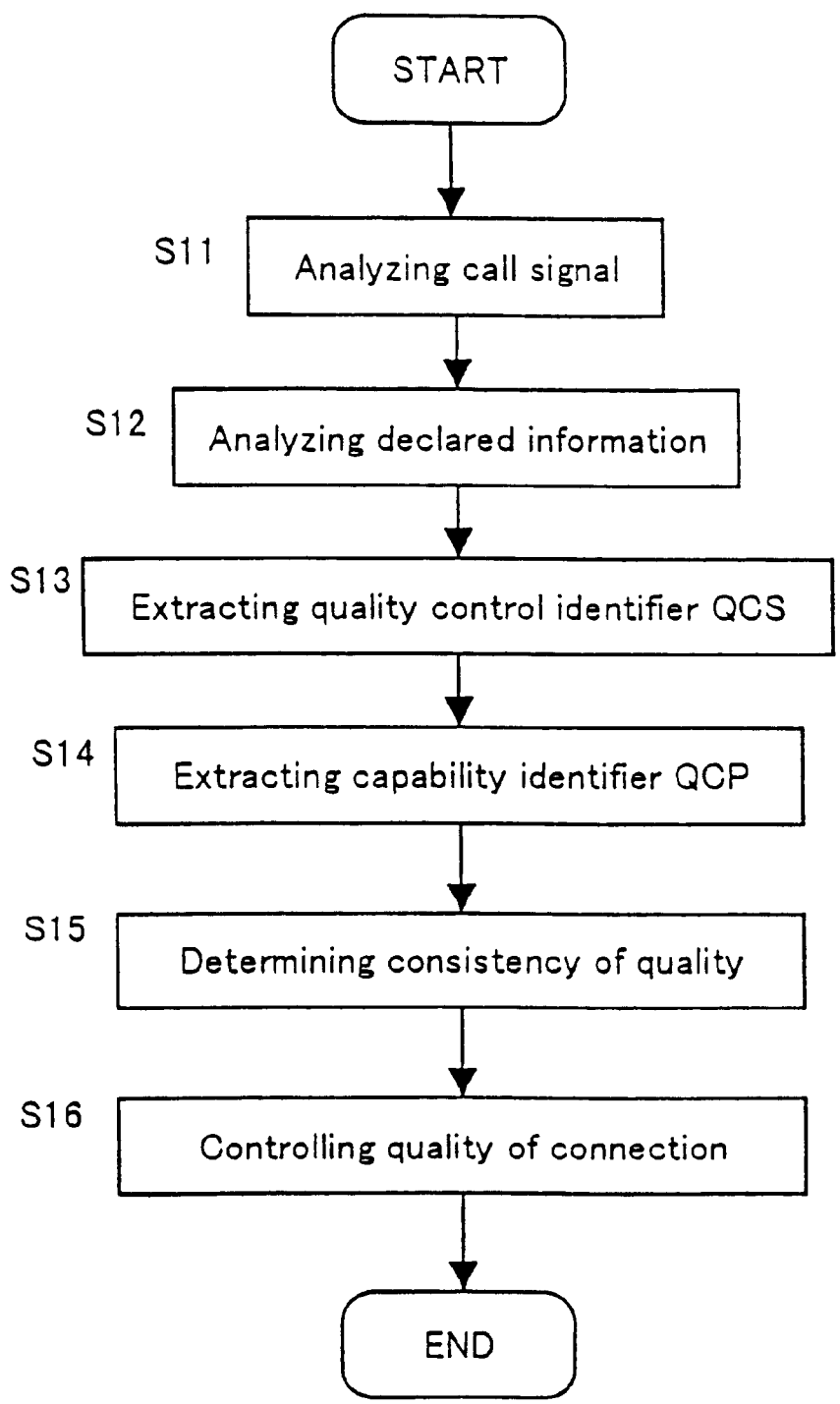
FIG. 2 is a flowchart showing the quality control processing performed for a first embodiment of the present invention.

FIG. 2 is a flowchart showing the quality control processing performed by the thus arranged ATM switch 1 according to a first embodiment of the present invention. When a call signal (setup message) is issued by the subscriber terminal 2A, the call signal is transmitted via the input line device 12 to the signal processor 13. At step S11, the signal processor 13 analyzes the call signal to determine whether it has been formed pursuant to the correct protocol.

At step S12 the call processor 14 performs a validity check for all the declared information included in the call signal, and determines the ASC (ATM Service Category) based on the declared information. The ASC is a bit rate form, and is broken down, for example, into a CBR (Constant Bit Rate) and a VBR (Variable Bit Rate). The declared information types are, for example, quality control information, traffic information, and bearer information. These information types are specified in detail by the advisory organization ITU-T or the ATM Forum.

When advisories differ as to which call signals from a plurality of subscriber terminals 2A conform, at step S12 the advisory to which the declared information included in the call signal conforms must be identified.

Figure 3:
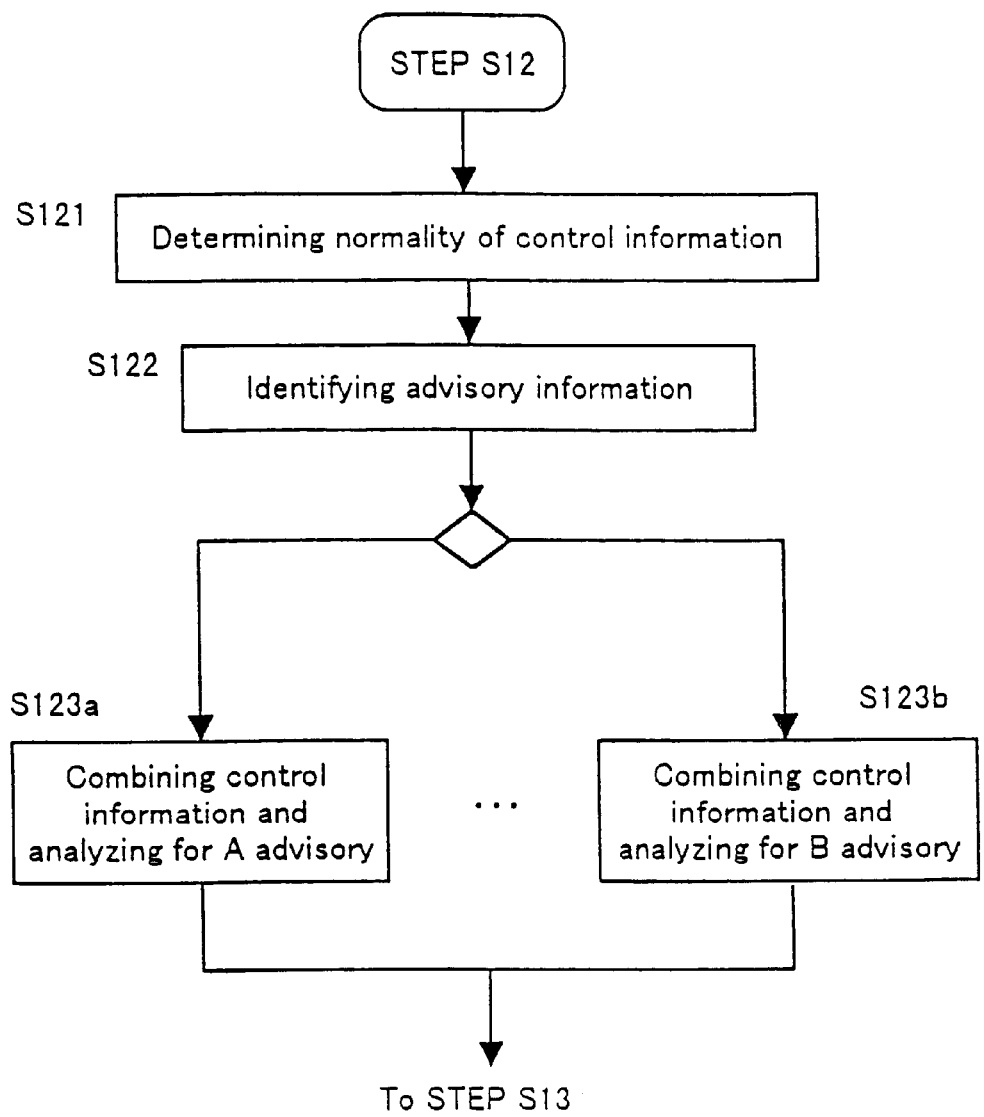
FIG. 3 is a detailed flowchart showing the process at step S12 for coping with a plurality of advisories.

FIG. 3 is a detailed flowchart for the process at step S12 for coping with a plurality of advisories. At step S121 the normality of each type of control information that is declared is determined. At step S122 the advisory information to which the subscriber terminal 2A which issued the call signal conforms is read from the memory 16, in which is stored identification information for advisories to which all the subscriber terminals 2A conform. At step S123a or S123b the control information is combined, based on the advisory which is identified, and the ASC is determined using the resultant information.

Figure 4:
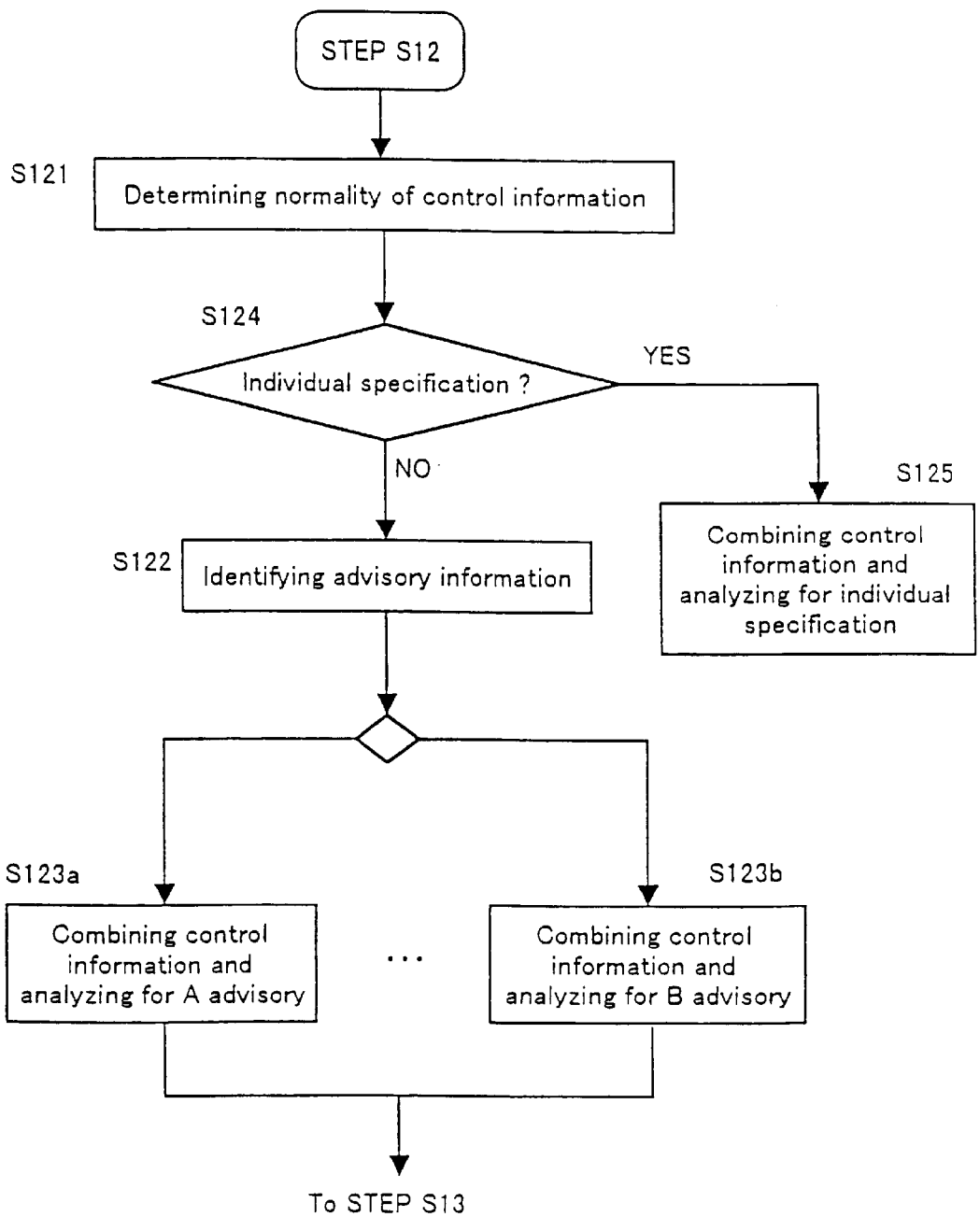
FIG. 4 is a more detailed flowchart showing the process at step S12 for coping with the advisories.

FIG. 4 is a more fully detailed flowchart for the process at step S12 for coping with a plurality of advisories. In FIG. 4, in addition to the identification of a plurality of advisories performed in FIG. 3, step 124 is provided to determine whether the subscriber terminals 2A have their own specifications. The information for each subscriber terminal 2A specifying whether or not the individual specification is present is stored in the memory 16. At step S124, when the individual specification is present, the control information is combined according to the specification, and the ASC is determined from the resultant information (step S125).

FIG. 5 is a diagram showing an example table in which is shown the relationship which exists between the declared information and the corresponding ASC. From among the different items of declared information, the call processor 14 employs BC (Bearer Class) (b) and ATC (ATM Transfer Capability) (c), both of which pertain to bearer control information, and BEI (Best Effort Information) (d), which is a traffic control signal, to determine the ASC (a).

When the ASC is obtained at step S12, at step S13 in FIG. 2, a quality control identifier QSC is extracted. Specifically, the quality control identifier (QSC) is obtained based on the ASC obtained at step S12 and the quality control information QOS (Quality Of Service) included in the items of declared information. The quality control identifier QSC is a characteristic identifier for the present invention, and, for identifying the capability of the controller, links declared information concerning the quality with a capability identifier QCP.

FIG. 6 is a diagram showing an example QSC determination table for the ASC and its corresponding QOS. As is shown in FIG. 6, the QOS is divided into five levels, from level 0 to level 4. Except for non-applicable (NA) portions, the quality control identifier QSC is set to each QOS level for the obtained ASCs (CBR, rt (real time)-VBR, nrt (non-real time)-VBR, ABR (Available Bit Rate), and UBR (Unspecified Bit Rate)).

When, at step S13, the quality control identifier QSC is obtained (extracted), at step S14 in FIG. 2 a capability identifier QCP which corresponds to the quality control identifier QSC is acquired (extracted).

FIG. 7 is a diagram showing an example table in which are entered the quality control identifier QSC obtained at step S13 and a corresponding capability identifier QCP. In FIG. 7, the capability identifiers QCP of the controllers which correspond to the quality control identifiers QSC are set. The call processor 14 determines that consistency that quality control according to the capability identifier QCP obtained from the table in FIG. 7 at step S14 can be provided or not. Individual devices in FIG. 7 are controller such as those in the UPC units 121 in FIG. 1, which are provided for the individual lines, while common devices are controllers such as the multiplexer 18 in FIG. 1, which is used in common in the ATM switch 1.

At step S16, the controller controls for the ATM connection the quality which corresponds to the obtained capability identifier QCP.

As is described above, according to the first embodiment, the quality control identifier QCS is introduced based on the declared information included in the call signal. As is shown in FIG. 5, a table is prepared for the quality control identifier QCS which corresponds to the ATM service category ASC and the quality control information QOS.

When, for example, the quality requested for a specific ASC or QOS is changed in the future due to the alteration of the contents of the advisory by the advisory organization, in accordance with the changed quality a new capability identifier QCP can be assigned by changing the value, or setting an additional value, for the quality control identifier QSC.

Furthermore, when, for example, control which provides a higher quality is required due to an improvement in the performance of the controller, the value of the QSC must be changed and the QSC must be assigned for the QCP by which the control for the higher quality control is performed, so that merely by changing the controller the quality of the ATM connection can be improved and an expandable quality control can be easily achieved.

That is, when a new controller can provide better quality control, only the conventional controller in a conventional ATM switch need be replaced with a new controller, so that without changing the ATM switchs a connection can be controlled in accordance with a requested quality, and the expansion property of the ATM switchs can be enhanced.

FIG. 8 is a diagram showing an example table in which the same QSC is entered regardless of the values assigned to the quality control information QOS and the ATM service category ASC. When the ATM network is used only for the Internet, the quality required is not very high. Therefore, when the same QSC value is provided for all the declared information, the controller performs a standardized quality control procedure using the same QCP, and a simple network operation can be achieved.

FIG. 9 is a diagram showing an example table for the ATM service category ASC and the corresponding quality control identifier QCS. As is shown in FIG. 9, the quality control identifier QCS may be determined only by the ASC, not by the quality control information QOS.

FIG. 10 is a diagram showing an example table in which, for device capabilities, a plurality of capability identifiers QCP are set in accordance with the quality control identifiers. When, for example, there are controllers which correspond respectively to new and old advisories, using the table in FIG. 10 the call processor 14 selects the QCPs in accordance with the advisories to which the controllers conform. Specifically, the QCPs are specified based on information pertaining to the editions of the advisories to which the controllers conform. This edition information is stored in the memory 16.

Figure 11:
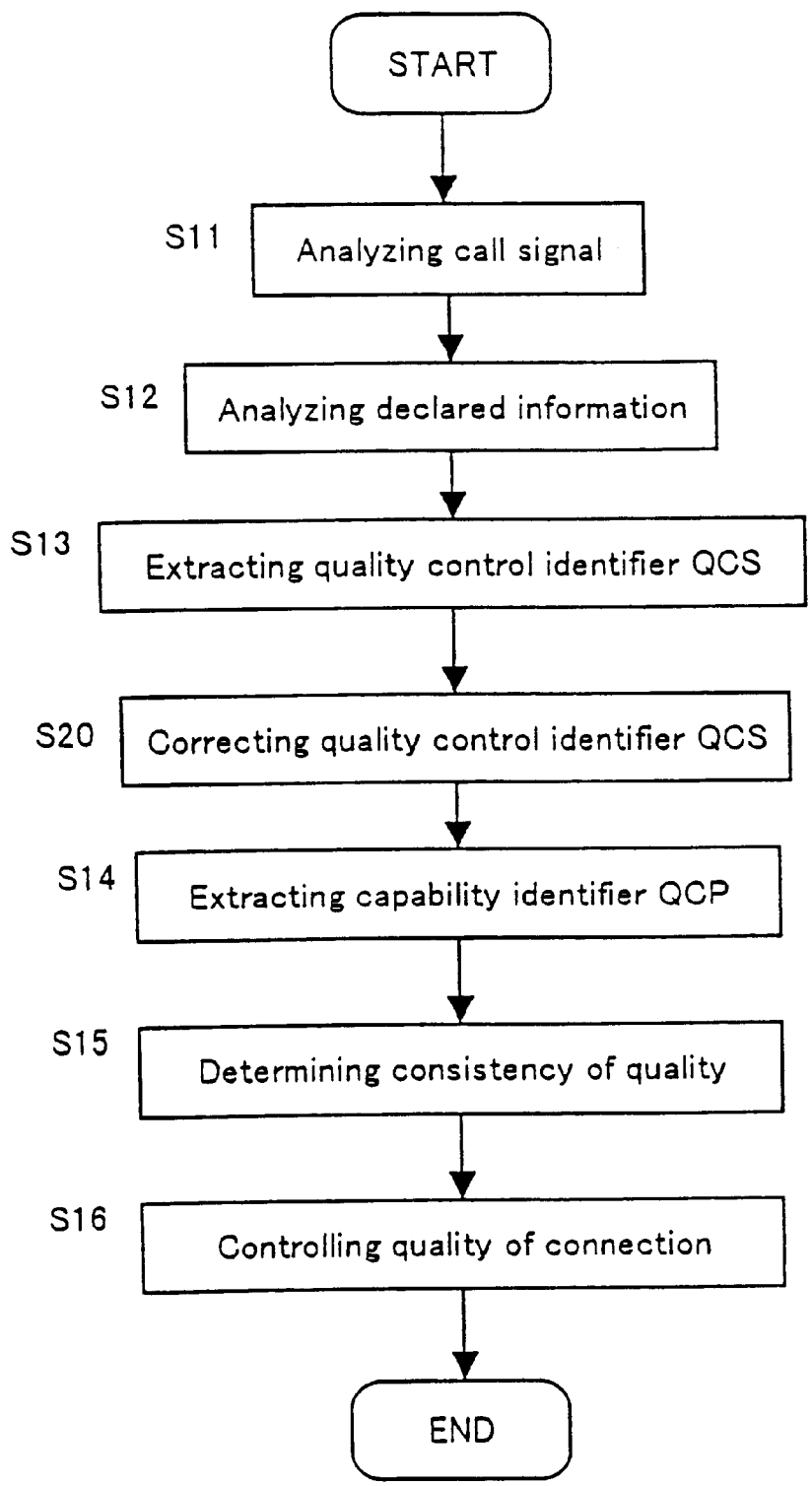
FIG. 11 is a flowchart showing the quality control processing performed for a second embodiment of the present invention.

FIG. 11 is a flowchart showing the quality control processing performed for a second embodiment of the present invention. In the flowchart for the second embodiment, steps S11 to S16 are prepared as in the first embodiment, while an added step S20 is provided between step S13 and step S14.

At step S20 the quality control identifier compensation process is performed. When the quality declared in the detailed quality information, which is included in the declared information, is not valid (is too high), compared with the quality which is determined by the ASC obtained at step S12 and the QSC obtained at step S13, generally the call processor 14 rejects the setup for the ATM connection prepared in accordance with the quality control.

Figures 12, 13:
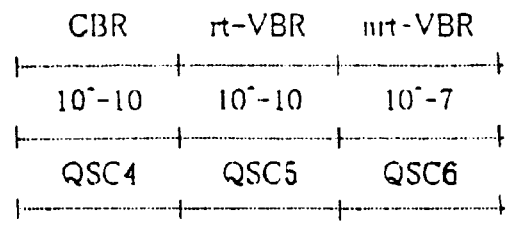
FIG. 12 is a diagram showing a management table for cell loss ratios determined by the ASC and the QOS.
FIG. 13 is a diagram showing a QOS compensation table in accordance with the cell loss ratios.

FIG. 12 is a diagram showing a management table for a cell loss ratio which is determined by the ASC and the QOS. In FIG. 12, when, for example, it is determined that the ASC is nrt-VBR and QSC6, the cell loss ratio is $10^{-7}$. If a cell loss ratio of $10^{-10}$ having a higher quality is declared as the detailed quality information, generally the call processor 14 will reject a request for an ATM connection.

Therefore, in the quality control identifier compensation process, the QSC value is so corrected that a request for an ATM connection will not be rejected even in the above described case.

FIG. 13 is a diagram showing a QSC correction table for a cell loss ratio. In FIG. 13, when the ASC is nrt-VBR and a cell loss ratio of $10^{-10}$ is declared, QSC5 is selected. As is shown in FIG. 5, QSC5 is the quality control identifier for the cell loss ratio of $10^{-10}$. Therefore, in this case, even when the ASC is nrt-VBR, a control is achieved which provides the same quality as that provided by rt-VBR.

Figure 14:
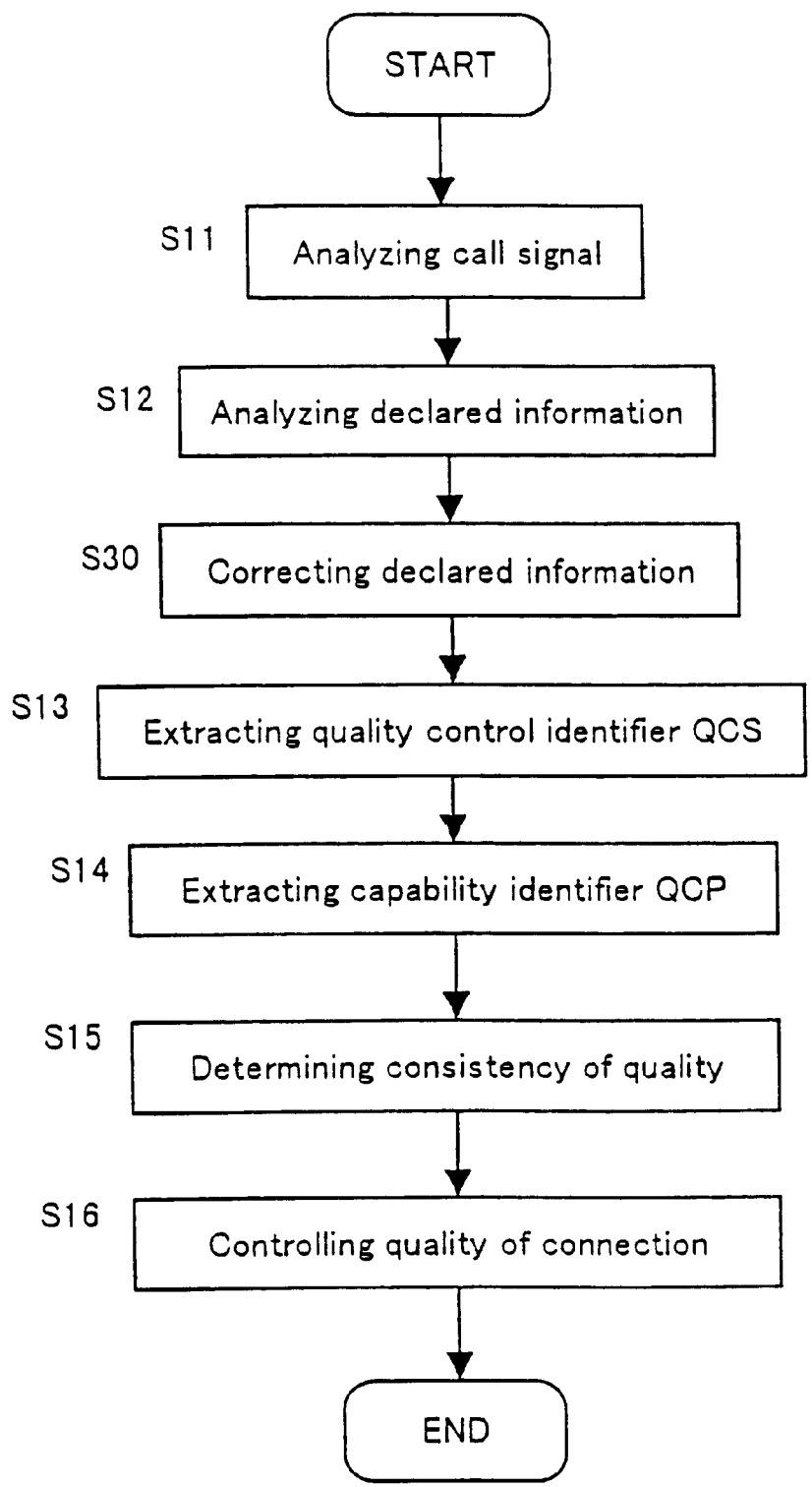
FIG. 14 is a flowchart showing the quality control processing performed for a third embodiment of the present invention.

FIG. 14 is a flowchart showing the quality control processing performed for a third embodiment of the present invention. In this flowchart, steps S11 to S16 are prepared as in the first embodiment, while an added step S30 for correcting the declared information is provided between step S13 and step S14.

At step S12 the ASC is obtained based on the bearer control information and the traffic information included in the declared information, as is described above. In this case, assume that the information for another ASC is mistakenly included as one part of the declared information.

FIG. 15 is a diagram showing the relationship between the ASC and traffic information. In FIG. 15, traffic information designated by a circle must be declared for each ASC. Assume that when the ASC obtained at step S12 is nrt-VBR, peak cell rates PCR (CLP=0) and PCR (CLP=0+1) are declared as the traffic information. In FIG. 12, for nrt-VBR the PCR (CLP=0) is not necessary, required instead are the sustainable cell rate SCR (CLP=0) and the maximum burst size MBS (CLP=0), or the SCR (CLP=0+1) and the MBS (CLP=0+1).

At step S30, therefore, the call processor 14 handles the declared PCR (CLP=0) as the SCR (CLP=0), and in addition generates a new MBS (CLP=0). As a result, normal quality control can be performed for which the ASC is nrt-VBR.

Figure 16:
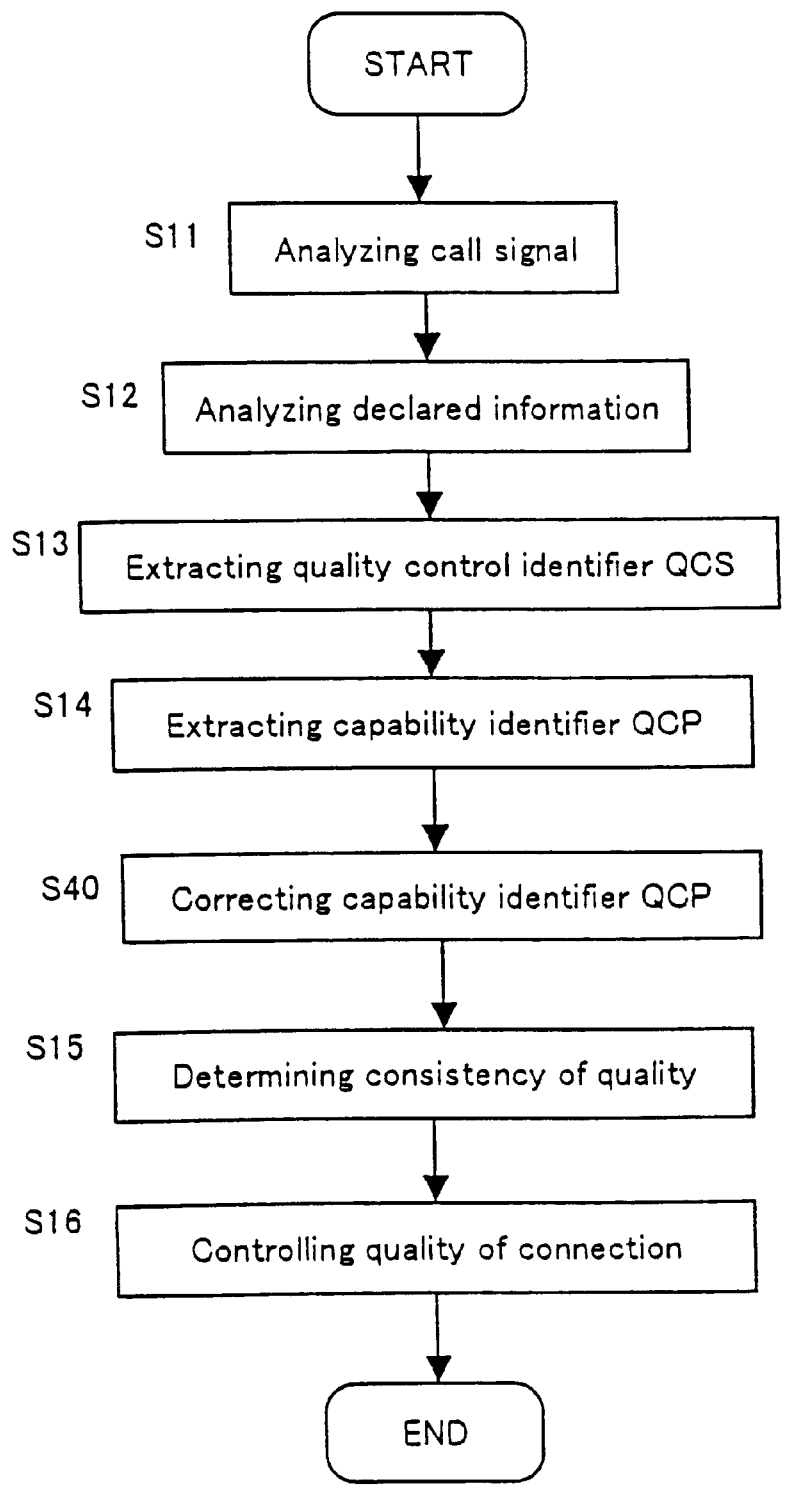
FIG. 16 is a flowchart showing the quality control processing performed for a fourth embodiment of the present invention.
Figure 18:
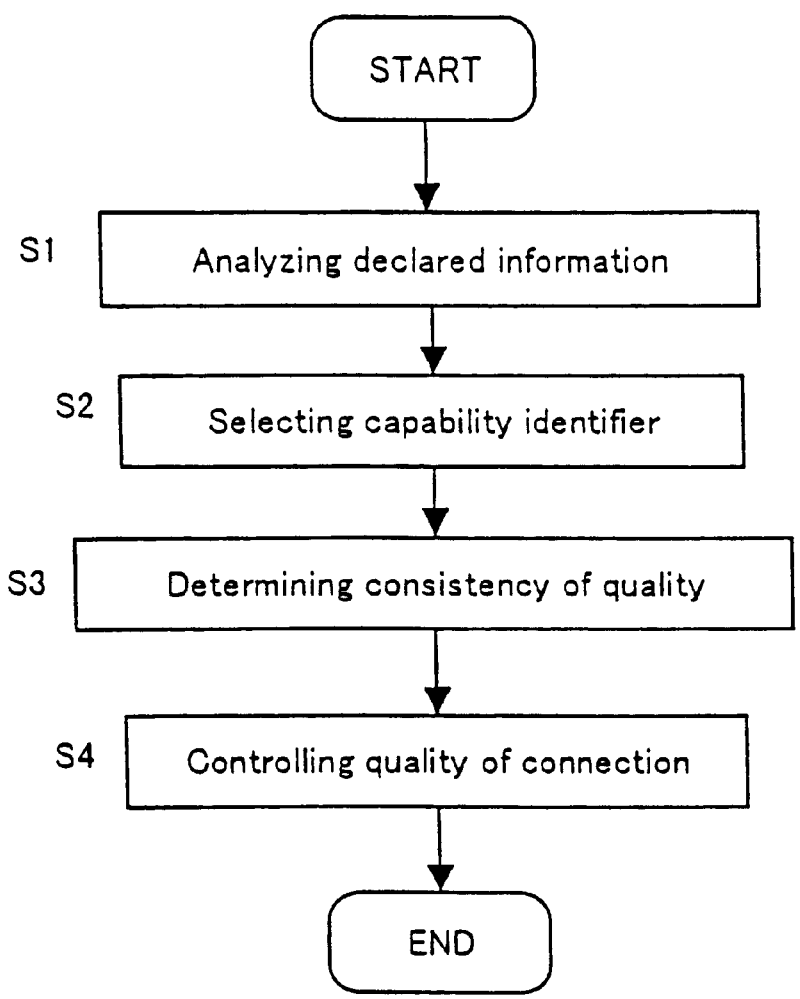
FIG. 18 is a flowchart showing the conventional quality control processing performed by an ATM switch.

FIG. 16 is a flowchart showing the quality control processing performed for a fourth embodiment of the present invention. In this flowchart, steps S11 to S16 are prepared as in the first embodiment, while the added step S40 for correcting the capability identifier QCP is provided between step S14 and step S15.

Specifically, when a specific controller controls the quality for a plurality of ATM connections, quality control may be concentrated at the same QCP and the traffic may become congested. In such a congested condition, the capacity of the buffer memory (in either the UPI unit 121 or the multiplexer 18) which is assigned for quality control using the QCP will be exceeded, and the controller will not be able to set up the ATM connection.

In the fourth embodiment, to enable the setup of the ATM connection under the above condition, at step S40 the call processor 14 produces a new QCP by correcting the QCP obtained at step S14. In other words, the call processor 14 employs a buffer area, in the buffer memory of the controller, which is assigned for another QCP and maintains a satisfactory capacity.

FIG. 17 is a diagram showing a table for the QSC and the QCP which is corrected in accordance with the frequency of the employment of the buffer area. In FIG. 17, normally QCP4 is set for QSC6, but when the buffer area for QCP4 can not be used any longer, the buffer area for QCP1 is employed to perform quality control in accordance with QCP1.

In a case where QCP4 is set to QCS7, the buffer area for QCP5 is employed to perform quality control in accordance with QCP5.

Furthermore, when a buffer area for the obtained QCP can not be used due to a specific barrier, a new QCP can be produced merely by correcting the obtained QCP, in order that the ATM connection can be set up by using a buffer area for that QCP.

As is described above, according to the present invention, the quality control identifier QCS is employed to link the declared information included in a call signal with the capability identifier QCP for identifying the capability of the controller which controls the quality of the ATM connection.

When the quality requested in specific declared information is changed due to the alteration of the contents of an advisory by an advisory organization, another capability identifier QCP can be assigned by changing or adding a setup for the value of the quality control identifier QSC.

In addition, when better quality control can be achieved as a result of an improvement in the performance of the controller, the value of the quality control identifier QSC can be changed and while a new QSC with which better control is possible can be assigned for the capability identifier QCP. As a result, merely by the replacement of the controllers the quality of the ATM connection can be improved, and quality control which has an expansion property can be easily achieved.

That is, when a new controller can provide better quality control, merely the conventional controller in a conventional ATM switch need be replaced by a new controller, so that without changing the ATM switches, a connection can be controlled in accordance with a requested quality, and the expansion property of the ATM switch can be enhanced.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An ATM switch comprising:
   a switch unit for routing an ATM cell input from an ATM connection at an input site to said ATM connection at an output site;
   a controller for controlling the quality of said ATM connection; and
   a memory for storing a quality control identifier for linking declared information concerning the quality of said ATM connection, the declared information being included in a call signal requesting the setup of said ATM connection, with a capability identifier for identifying the capability of said controller,
   wherein said controller controls the quality of said ATM connection based on said capability corresponding to said capability identifier designated based on said quality control identifier obtained from said declared information.

2. The ATM switch according to claim 1, further comprising:
   a call processor for obtaining said quality control identifier based on said declared information.

3. The ATM switch according to claim 2, wherein said call processor identifies an advisory to which said declared information conforms from among a plurality of advisories provided by a plurality of advisory organizations, analyzes said declared information based on said identified advisory, and obtains said quality control identifier.

4. The ATM switch according to claim 2, wherein said call processor identifies whether said declared information conforms to an advisory from an advisory organization, or to an individual specification, analyzes said declared information based on said advisory or said specification which has been identified, and obtains said quality control identifier.

5. The ATM switch according to claim 2, wherein said call processor obtains said quality control identifier based on bearer information and traffic control information, both of which are included in said declared information.

6. The ATM switch according to claim 2, wherein said call processor obtains said quality control identifier based on bearer information, traffic control information and quality control information, all of which are included in said declared information.

7. The ATM switch according to claim 5, wherein said call processor obtains an ATM service category based on a combination of said bearer information and said traffic control information, and obtains said quality control information based on said ATM service category and detailed quality information included in said declared information.

8. The ATM switch according to claim 7, wherein said detailed quality information is an ATM cell loss ratio.

9. The ATM switch according to claim 6, wherein said call processor obtains an ATM service category based on a combination of said bearer information and said traffic control information, both of which are included in said declared information, and obtains said quality control information based on said ATM service category.

10. The ATM switch according to claim 9, wherein when said ATM service category is not acquired from said combination of said bearer control information and said traffic control information,
   said call processor obtains said ATM service category based on either said bearer control information or said traffic control information, and corrects the other control information so that said other control information corresponds to said obtained ATM service category.

11. The ATM switch according to claim 1, wherein said memory stores a plurality of capacity identifiers for said quality control identifier, said plurality of capacity identifiers are according to each of the edition numbers of an advisory to which the capability of said controller conforms.

12. The ATM switch according to claim 1, wherein said memory stores the same quality control identifier for a plurality of different items of declared information.

13. The ATM switch according to claim 1, wherein, when said controller is not capable of controlling the quality in accordance with a capability corresponding to said designated capability identifier, said controller corrects said designated capability identifier to a different capability identifier, and controls the quality based on a capability corresponding to said different capability identifier.

14. A quality control method for controlling an ATM connection comprising the steps of:
   obtaining a quality control identifier from a declared information concerning the quality of said ATM connection, the declared information being included in a call signal requesting the setup of said ATM connection and said quality control identifier being for linking said declared information with a capability identifier for identifying the capability of a controller which controls the quality of said ATM connection;

designating said capability identifier based on obtained quality control identifier; and controlling the quality of said ATM connection based on said capability corresponding to said designated capability identifier.

15. The quality control method according to claim 14, wherein at said obtaining step, said quality control identifier is obtained based on bearer information and traffic control information, both of which are included in said declared information.

16. The quality control method according to claim 14, wherein at said obtaining step, said quality control identifier is obtained based on bearer information, traffic control information and quality control information, all of which are included in said declared information.

17. The quality control method according to claim 16, wherein at said obtaining step, an ATM service category is obtained based on a combination of said bearer information and said traffic control information, and wherein said quality control information is obtained based on said ATM service category and detailed quality information included in said declared information.

18. The quality control method according to claim 16, wherein at said obtaining step, an ATM service category is obtained based on a combination of said bearer information and said traffic control information, both of which are included in said declared information, and said quality control information is obtained based on said ATM service category.

19. The quality control method according to claim 18, further comprising a step of:

obtaining said ATM service category based on either said bearer control information or said traffic control information, when said ATM service category is not obtained from said combination of said bearer control information and said traffic control information; and correcting the other control information so that said control information corresponds to said obtained ATM service category.

20. The quality control method according to claim 14, further comprising a step of:

correcting said designated capability identifiers to a different capability identifier; and wherein at said controlling step, said quality control is controlled based on a capability corresponding to said different capability identifier, when quality control is disabled in accordance with a capability which corresponds to a designated capability identifier.

* * * * *